United States Patent
Burgdorf

[11] 3,783,981
[45] Jan. 8, 1974

[54] SELF-ADJUSTING DEVICE FOR BRAKES
[75] Inventor: Jochen Burgdorf, Odenwaldring, Germany
[73] Assignee: ITT Industries, Inc., New York, N.Y.
[22] Filed: July 26, 1972
[21] Appl. No.: 275,374

[30] Foreign Application Priority Data
Aug. 31, 1971 Germany.................. P 21 43 575.7

[52] U.S. Cl.......... 188/106 F, 188/71.9, 188/196 D
[51] Int. Cl............................................. F16d 55/16
[58] Field of Search.............. 188/72.6, 71.9, 106 F, 188/196 D

[56] References Cited
UNITED STATES PATENTS
3,610,373  10/1971  Burnett............................. 188/71.9
3,584,711   6/1971  Margetts....................... 188/72.6 X
3,489,251   1/1970  Swift................................. 188/72.6

Primary Examiner—Duane A. Reger
Attorney—C. Cornell Remsen, Jr. et al.

[57] ABSTRACT

This relates to an automatic lining-wear adjusting device for a hydraulically and mechanically actuated spot-type disc brake. The adjusting device includes an adjusting spindle and an adjusting nut threaded together by a steep thread. The adjusting spindle is connected to the actuating piston and follows the axial piston movement without rotary motion. The adjusting nut rotates on the spindle for lining-wear adjustment. This rotation of the adjusting nut is accomplished by a spring biasing the adjusting nut against a low friction bearing at the cylinder bottom. To maintain handbrake clearance and to actuate the piston by the handbrake, a handbrake actuated mechanism engages the spindle-nut arrangement to prevent relative rotary motion of the two elements of this arrangement and at the same time causes axial motion of the arrangement to actuate the piston for brake application.

10 Claims, 1 Drawing Figure

PATENTED JAN 8 1974  3,783,981
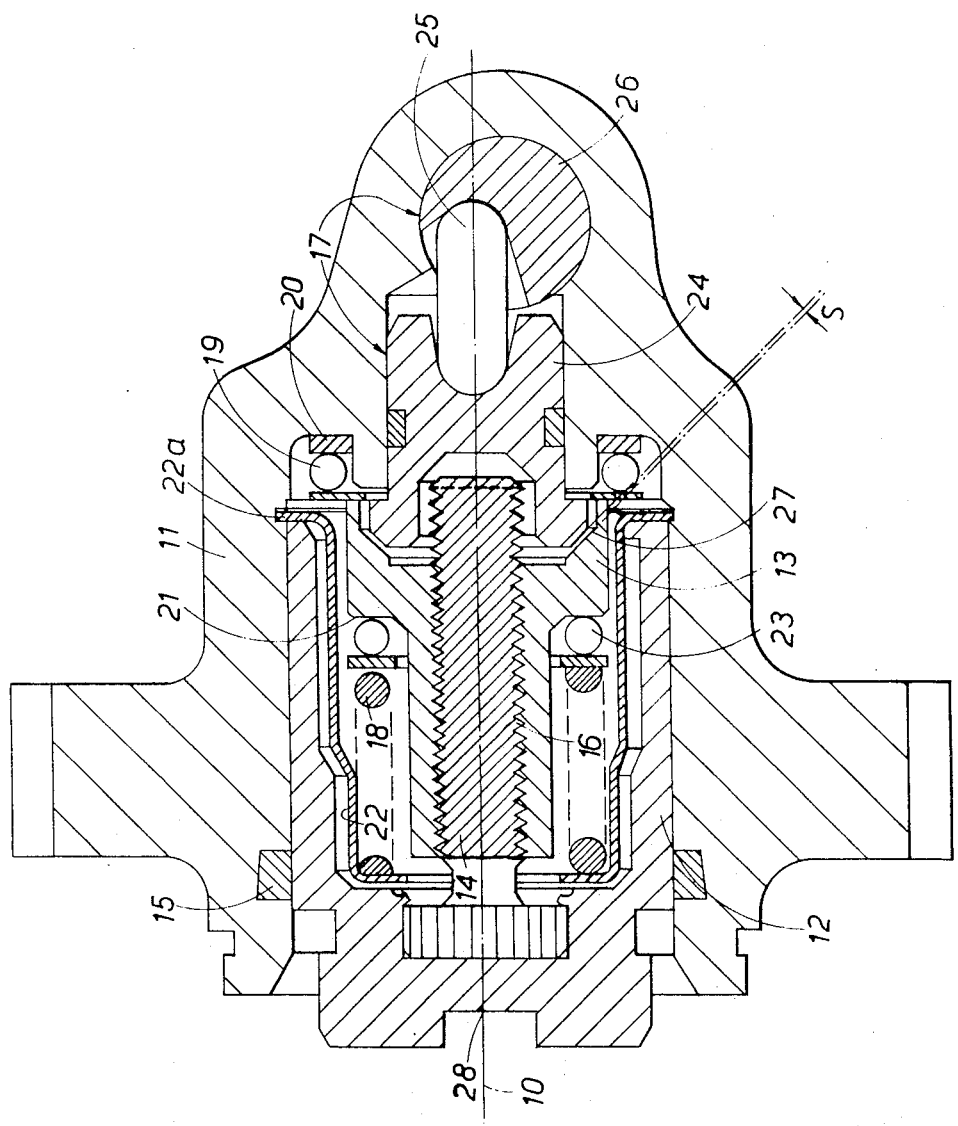

SELF-ADJUSTING DEVICE FOR BRAKES

BACKGROUND OF THE INVENTION

The invention relates to a brake, and more particularly to a spot-type disc brake provided with a self-adjusting device. The self adjusting device is included within a brake piston arranged in a hydraulic cylinder. The self adjusting device includes an adjusting nut and an adjusting spindle arranged between the cylinder and the piston with a mechanical handbrake actuated mechanism and a return spring being provided for the piston. The adjusting nut and adjusting spindle are threaded together by a steep thread.

In such brakes there exists the problem that the brake clearance resulting from the actuation of the handbrake may change in the course of the adjustment caused by the lining wear. Further, the resetting of the adjusting device after replacement of the worn brake linings is often rendered problematic, since a special tool is required.

SUMMARY OF THE INVENTION

Thus, the object of the present invention is to provide a brake of the type referred to above where even after numerous adjusting steps the brake clearance of the handbrake remains unchanged and where additionally the resetting of the adjusting device is easily realizable. Further, the manufacture of the brake is economical and its operation is safe.

A feature of the present invention is the provision of a self-adjusting device for a brake comprising: a hydraulic cylinder having a longitudinal axis and a first bore disposed coaxial of the axis, the first bore being open at one end and having a transverse cylinder bottom at the other end; a hollow brake piston coaxial of the axis and slidably sealed to the inner surface of the first bore, the piston having a transverse brake actuating surface adjacent the one end of the first bore; an adjusting spindle coaxial of the axis within the piston, the spindle being connected to the inner surface of the brake actuating surface capable of axial motion only; an adjusting nut coaxial of the axis threaded to the outer surface of the spindle and in a low friction relation with the cylinder bottom; a spring biasing the nut toward the cylinder bottom to enable rotary motion between the spindle and the nut to enable a desired adjustment to compensate for brake lining wear; the nut and the spindle having a steep thread; and a handbrake actuated mechanism coaxial of an extension of the axis to engage one of the nut and the spindle upon actuation thereof to prevent relative rotary motion between the nut and the spindle and to provide axial motion of the spindle to actuate the piston for brake application.

According to another feature of the present invention a steep thread is provided between the adjusting nut and the adjusting spindle so as to enable the normal brake pressure and a return force to effect a relative rotation between the nut and the spindle and to enable a direct action of the handbrake on that part of the nut-spindle arrangement which is supported by the cylinder and which under the action of the handbrake will lift off from the cylinder bottom against the force of a spring. Thus, the handbrake acts on that part which even after numerous adjusting steps will not change its relative position with respect of the cylinder. Due to the inventive dimensioning of the steep thread the resetting after the re-lining can be simply carried out by manual insertion of the brake piston.

According to still another feature of the present invention the return force is generated by a roll-back seal which seals the piston to the cylinder. In this embodiment the adjusting device which works with a nut and a spindle has the task to further assist the action of the roll-back seal which supports the piston. Besides, the roll-back seal has the essential task to perpetuously keeping the catch element for the handbrake, i.e., the adjusting spindle or the adjusting nut, at the same distance with respect to the handbrake actuated mechanism.

According to still another feature of the present invention the adjusting spindle is connected to the piston so as to be locked against torsional (rotational) movement, the piston on its part being disposed within the cylinder so as to be locked against rotational movement, and the nut supports itself on the cylinder bottom via a ball bearing. In this embodiment, the adjusting nut preferably has a step by means of which it supports itself against a housing rigidly fixed to the cylinder via a spring which presses the nut towards the cylinder bottom. Since according to the present invention the piston is arranged so as to be locked against rotational movement, the ball bearings will allow the adjusting nut to rotate only as much as is necessary for the adjustment. The spring enables the adjusting nut to lift off from the cylinder bottom only as much as is necessary for the application of the brake linings when the handbrake is actuated.

According to still a further feature of the present invention between the spring and the housing a further ball bearing is situated which further favors the free twistability of the adjusting nut.

In order to safely prevent a rotation of the adjusting nut upon the actuation of the handbrake there is provided between the handbrake actuated mechanism and the nut-spindle arrangement a torsionally strong connection which will become effective upon the actuation of the handbrake.

To this end, a handbrake piston, arranged in a bore of the cylinder bottom, and the adjusting nut each have a frictional cone forming the torsionally (rotationally) strong connection. The brake clearance of the handbrake is preferably provided between the two frictional cones.

BRIEF DESCRIPTION OF THE DRAWING

The above-mentioned and other features and objects of this invention and the manner of obtaining them will become more apparent by reference to the following description taken in conjunction with the drawing, the single FIGURE of which illustrates a longitudinal cross sectional view of a brake in accordance with the principles of the present invention, the brake linings the brake disc, and the handbrake not being illustrated.

DESCRIPTION OF THE PREFERRED EMBODIMENT

According to the drawing the hollow brake piston 12 is slidably sealed and axially displaceable in a first bore in a conventional hydraulic cylinder 11. The first bore and piston 12 are coaxial of the longitudinal axis 10. The sealing-off and the resetting of the piston 12 are ensured by a roll-back seal 15 in a manner known per se.

The adjusting device consists of an adjusting spindle 14, coaxial of axis 10, fixed at the bottom of hollow piston 12 so as to be locked against torsional (rotational) movement and of an adjusting nut 13 connected with the adjusting spindle via a steep thread. Adjusting nut 13 is essentially cylindrical in shape and coaxial of axis 10. According to the invention, however, at the end thereof towards the cylinder bottom 20 nut 13 is provided with an annular step 21 which serves as support for a ball bearing 23. On the opposite side, adjusting nut 13 is rotatably connected with cylinder bottom 20 by a further ball bearing 19. The abutment of the ball bearing 19 at cylinder bottom 20 is ensured by a helical pressure (bias) spring 18 engaging ball bearing 23 and supporting itself in cylinder 11 via a housing 22 rigidly connected with cylinder 11.

The steep thread 16 between nut 13 and spindle 14 is designed such that the normal brake pressure ensures a mutual twisting of both the nut and the spindle.

A handbrake actuated mechanism 17 consisting of an eccentric 26, a push rod 25 and a handbrake piston 24. Piston 24 acts on adjusting nut 13 via a connection 27. Connection 27 locks nut 13 and piston 24 against torsional movement during the operation of the handbrake. Push rod 25 has a flat shape to cooperate in locking piston 24 against torsional movement during the operation of the handbrake.

Piston 12 can be secured against twisting by means of a groove 28 at the pressure surface of piston 12, which is of essential imporance for the operation of the invention. Groove 28 receives a mating portion on the backing plate of the brake shoe (not shown) associated with piston 12. The backing plate is rigidly locked against rotational movement by the manner in which the backing plate is mounted in the brake caliper.

The operation of the invention is as follows: Upon any normal hydraulic braking operation piston 12 is advanced and retracted by the normal brake clearance.

If there is excessive brake lining wear piston 12 will advance further so that adjusting nut 13 will be more and more screwed off of adjusting spindle 14. According to the invention the operation will be so that upon any normal braking operation adjusting nut 13 will also advance somewhat and subsequently move back again. However, the steep thread 16 may also be provided with a thread play corresponding to the brake clearance.

If the handbrake mechanism is to be actuated, eccentric 26 will be twisted counter-clockwise and handbrake piston 24 will come into abutment with frictional connection 27. Adjusting nut 13 now is moved axially against the force of spring 18 towards the brake disc. It is of essential importance that both piston 11 and handbrake piston 24 are held so as to be unable to twist. Otherwise an undesired relative twisting between adjusting nut 13 and adjusting spindle 14 could be the result during the actuation of the handbrake.

When the actuation of the handbrake is terminated, the brake clearance of the handbrake is restored which neutralizes the torsionally strong connection between nut 13 and handbrake piston 24.

After the replacement of a worn brake lining the adjusting device may be easily returned (reset) into its initial position by simply pressing piston 12 back by hand. In doing so, nut 13 will screw itself back onto spindle 14.

The essential feature of roll-back seal 15 is that its restoring torque will be neutralized upon achieving any restoring of the brake clearance. Thus, it is possible for thread 16 to become so steep that even small forces acting on either the nut or the spindle will effect a relative rotation in an axial direction.

The brake clearances of the handbrake may be selected as small as permissible on the grounds of the usual manufacturing tolerances. The brake clearances does not depend on the operating conditions of the brake and particularly is not influenced by either abrupt braking, or by the caliper's expansion, or the compressibility of the linings. This is the decisive advantage of the inventive brake.

According to the invention the brake clearance s of the handbrake is preferably made adjustable which may be effected by an adjustable abutment at the actuation lever, or at the actuation shaft, respectively, of the handbrake.

If the brake clearnace s of the handbrake is to be brought down to zero which is possible without any difficulties, there must be measures taken in order to carry out the resetting of piston 12 after re-lining. According to the invention such measures can simply consist in that in such a case the handbrake piston 24 can be set back by such an amount as is necessary for restoring the clearance s required for the twisting of nut 13. In the case where the brake clearance s of the handbrake is reduced to zero, the twisting of adjusting nut 13 upon a normal hydraulic brake actuation is effected by adjusting nut 13 lifting-off of frictional connection 27 enough that it can twist under the action of steep thread 16. In this case steep thread 16 must have a play which corresponds to the brake clearance of the brake and which furthermore must be able to compensate for both the expansion of the caliper and the compressibility of the linings.

In more simple brake designs the handbrake clearance s will be dimensioned so as to be sufficient so that no adjusting facility need be provided.

The shape of housing 22 is preferably adapted as far as possible to the inside shape of cup-shaped piston 12. It is anchored in the area of cylinder bottom 20 in the cylinder wall and its anchoring flange 22a preferably also serves to limit the moving-back of piston 12.

While I have described above the principles of my invention in connection with specific apparatus it is to be clearly understood that this description is made only by way of example and not as a limitation to the scope of my invention as set forth in the objects thereof and in the accompanying claims.

I claim:

1. A self-adjusting device for a brake comprising:
   a hydraulic cylinder having a longitudinal axis and a first bore disposed coaxial of said axis, said first bore being open at one end and having a transverse cylinder bottom at the other end;
   a hollow brake piston coaxial of said axis and slidably sealed to the inner surface of said first bore, said piston having a transverse brake actuating member adjacent said one end of said first bore;
   an adjusting spindle coaxial of said axis within said piston, said spindle having one end thereof directly connected to said brake actuating member, said spindle being capable of axial motion only;

an adjusting nut coaxial of said axis threaded to the outer surface of said spindle and in a low friction relation with said cylinder bottom;

a spring biasing said nut toward said cylinder bottom to enable rotary motion of said nut relative to said spindle to enable a desired adjustment to compensate for brake lining wear;

said nut and said spindle having a steep thread; and a handbrake actuated mechanism coaxial of an extension of said axis to engage one of said nut and said spindle upon actuation thereof to prevent relative rotary motion between said nut and said spindle and to provide axial motion of said spindle to actuate said piston for brake application.

2. A device according to claim 1, wherein
said mechanism directly engages said nut.

3. A device according to claim 1, further including
a roll-back seal disposed between the inner surface of said first bore and the outer surface of said piston adjacent said one end of said first bore cooperating to provide a return force.

4. A device according to claim 1, further including
a ball bearing between said cylinder bottom and said nut to provide a low friction contact between said nut and said cylinder bottom.

5. A device according to claim 1, further including
a housing disposed within said piston and external of said nut coaxial of said axis, one end of said housing being secured to the inner surface of said first bore adjacent said other end thereof and the other end of said housing having a transverse surface extending toward said axis, and
wherein
said nut includes a step extending toward said axis, and said spring is disposed between said step and said other end of said housing.

6. A device according to claim 5, further including
a ball bearing disposed between said spring and said step.

7. A device according to claim 1, wherein
a strong rotation limiting connection exists between one of said nut and said spindle and said mechanism upon actuation of said mechanism.

8. A device according to claim 7, wherein
said cylinder further includes
   a second bore disposed coaxial of an extension of said axis and extending through said cylinder bottom; and
said mechanism includes
   a handbrake actuated piston coaxial of said extension of said axis and slidably sealed to the inner surface of said second bore;
said handbrake actuated piston and said nut having mating conical surfaces to provide said strong rotation limiting connection upon actuation of said handbrake piston.

9. A device according to claim 8, wherein
a handbrake clearance is provided between said mating conical surfaces when said handbrake piston is not actuated.

10. A device according to claim 8, wherein
said mechanism further includes
   a flat push rod coaxial of said extension of said axis to actuate said handbrake piston, the flat shape of said push rod acting to cooperating in preventing rotary motion of said handbrake piston and said nut.

\* \* \* \* \*